(12) United States Patent
Soloveichik et al.

(10) Patent No.: US 8,304,121 B2
(45) Date of Patent: Nov. 6, 2012

(54) PRIMARY ALUMINUM HYDRIDE BATTERY

(75) Inventors: Grigorii Lev Soloveichik, Latham, NY (US); John Patrick Lemmon, Schoharie, NY (US); Ji-Cheng Zhao, Latham, NY (US)

(73) Assignee: General Electric Company, Niskayuuna, NY (US)

( * ) Notice: Subject to any disclaimer, the term of this patent is extended or adjusted under 35 U.S.C. 154(b) by 398 days.

(21) Appl. No.: 12/217,363

(22) Filed: Jun. 30, 2008

(65) Prior Publication Data
US 2009/0325070 A1 Dec. 31, 2009

(51) Int. Cl.
*H01M 4/36* (2006.01)
*H01M 6/04* (2006.01)
(52) U.S. Cl. ............... 429/405; 429/188; 429/218.1; 429/403

(58) Field of Classification Search ........ 429/122–347, 429/27–82, 402–407; 29/623.1–623.5
See application file for complete search history.

(56) References Cited

U.S. PATENT DOCUMENTS

| | | | | |
|---|---|---|---|---|
| 4,977,007 A | * | 12/1990 | Kondo et al. | 428/76 |
| 5,316,875 A | * | 5/1994 | Murai et al. | 429/337 |
| 6,228,338 B1 | * | 5/2001 | Petrie et al. | 423/265 |
| 2004/0038090 A1 | * | 2/2004 | Faris | 429/12 |
| 2005/0238949 A1 | * | 10/2005 | Morris et al. | 429/113 |

* cited by examiner

*Primary Examiner* — Basia Ridley
*Assistant Examiner* — Jonathan G Leong
(74) *Attorney, Agent, or Firm* — Francis T. Coppa

(57) ABSTRACT

A primary aluminum hydride cell and a battery formed with a plurality of the cells is described herein. The cells are constructed of an anode, a cathode and an aqueous electrolyte, and the anode comprises aluminum hydride and a conductive material. In some embodiments, the cathode comprises an air diffusion cathode.

7 Claims, 2 Drawing Sheets

PRIMARY ALUMINUM HYDRIDE BATTERY

BACKGROUND OF THE INVENTION

Primary batteries are widely used for many applications. There is a need for high capacity batteries for certain applications such as remote communications, ocean navigation units (long term, low rate discharge) or recharging of secondary batteries. High gravimetric and volumetric capacities are essential for such applications.

Primary batteries with metal anodes (lithium, magnesium, aluminum, etc.) and various cathodes have high capacity. Metal-air batteries, where air oxygen serves as an oxidant in an air diffusion cathode, are known, and they are characterized by a high energy density, a flat discharge voltage, and long shelf storage, when stored dry. They are environmentally safe when properly disposed of, and available at a relatively low cost. The best known of the metal-air batteries are the zinc-air battery and the aluminum-air battery, where zinc or aluminum is oxidized by atmospheric oxygen. The zinc-air battery has a higher volumetric and gravimetric capacity than other widely used batteries, including lithium ion batteries. Aluminum anodes have the closest volumetric and gravimetric capacity to lithium metal (2.98 Ah/g vs. 3.86 Ah/g). However such capacity is still insufficient for some applications.

Lithium has a very high gravimetric capacity but low volumetric capacity (1.98 Ah/cm$^3$), and is very reactive, which makes handling difficult and hazardous, and which, makes lithium-air cell design more complicated.

BRIEF SUMMARY OF THE INVENTION

The present invention provides a cell and a battery having a plurality of said cells where said cells may comprise or consist essentially of:

(a) an anode comprising aluminum hydride and a conductive material;
(b) a cathode; and
(c) an aqueous electrolyte.

In one embodiment the cathode comprises an air diffusion cathode. In another embodiment the cathode comprises a metal oxide or hydroxide, where the metal is selected from the group consisting of manganese, nickel, and silver. In yet another embodiment an active cathodic material, e.g. hydrogen peroxide or a ferricyanide salt, is added to the liquid electrolyte. These materials may be in various forms, e.g. aqueous solutions, slurries, and the like.

When the battery "comprises" the recited materials, it may include materials that have a material effect on the properties or operation of the battery. When the battery "consists essentially" of the recited materials, it will not include materials that will have a material effect on the operation or properties of the battery.

A suitable chamber or casing is provided for each cell, and when a plurality of cells are formed into a battery, a suitable chamber or casing which is substantially or completely inert to chemical interaction with the electrolyte is provided with any necessary conductors that link the individual cells together.

DETAILED DESCRIPTION OF THE INVENTION

The discharge reactions for the aluminum hydride cell are as follows:

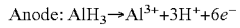

Anode: $AlH_3 \rightarrow Al^{3+} + 3H^+ + 6e^-$

Cathode: $O_2 + 2H^+ + 4e^- \rightarrow 2OH^-$

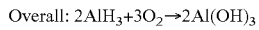

Overall: $2AlH_3 + 3O_2 \rightarrow 2Al(OH)_3$

Since aluminum hydride is unstable in caustic solutions, it can be discharged in neutral or slightly acidic electrolytes to the highest of known gravimetric capacity (5.36 Ah/g vs. 3.86 Ah/g for lithium metal vs. 2.98 Ah/g for Al metal) and very high volumetric capacity (7.83 Ah/cm$^3$), which is comparable with the highest known value for aluminum metal (8.01 Ah/cm$^3$)

Figure 1:
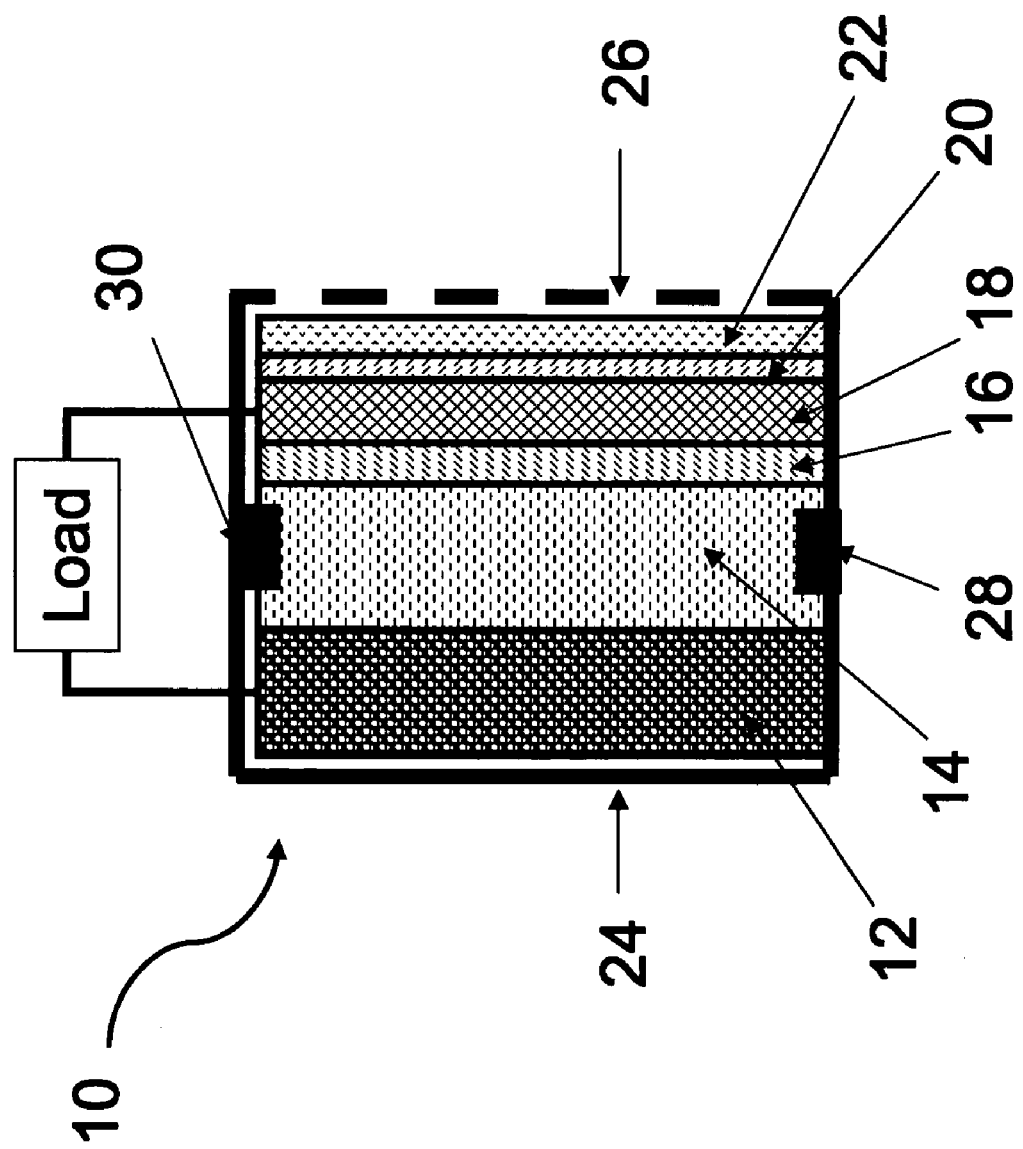
FIG. 1 illustrates a schematic diagram of a cell with an aluminum hydride anode and an air cathode according to the invention, which illustrates the arrangement of the component parts.

The battery may have a plurality of cells, each of which is an open vessel which has an anode comprised of aluminum hydride and an air cathode in an ionic connection, via an electrolyte. The air cathode is in a connection with air or another source of oxygen. The electrolyte is preferably added at the time the battery is placed in service and is added to the battery to activate the battery. FIG. 1 shows a schematic of a single cell, which in the case of a battery is replicated and electrically interconnected as many times as necessary in order to provide the desired voltage output from the battery.

The cathode utilizes oxygen derived from air or another source and in order to avoid overheating, the battery has a vented cell with internal surfaces which are sized to assist in the dissipation of heat that is generated in the battery cells. The vessel is made of materials such as ceramics, plastics including polyvinyl chloride; polyphenylene oxide blends with styrene and combinations thereof. These materials are all commercially available, and the selection of any particular material for the container is not critical.

The vessel is preferably rigid and is provided with means to allow for adding the electrolyte solution, which may be water with a sufficient amount of an organic or inorganic water-soluble salt such as lithium chloride, sodium chloride, potassium chloride, magnesium chloride, magnesium sulfate etc., at a concentration of 5 to 35 wt. %, depending on the salt, or a 1 to 5 molar, preferably 2 to 4 molar, to provide maximum electrolyte conductivity and the best solubility of reaction products. In one embodiment, the liquid electrolyte is 12 wt. % of NaCl in water. The weight percentages are based on the total weight of the salts and the water in the electrolyte and any other additive in the water of the electrolyte. The electrolyte may contain an effective amount of an antifoam agent such as a perfluorinated polyethylene available from Dow Chemical as DOWEX® 1410, which may be used at a level of 0.5 to 20 ppm or more preferably at a level of 2-3 ppm, to control foaming in the electrolyte. Another optional ingredient is a corrosion inhibitor such as sodium stannate, which may be added at a level of 0.02 to 0.2 molar based on the total volume of the electrolyte.

An anode may be made by mixing 50-90 wt % of aluminum hydride with 2-10 wt % of a powdered polytetrafluoroethylene polymer or co-polymer binder, and the rest of a conductive element such as carbon, copper, or aluminum. The conductive element (carbon, aluminum or copper) is usually in the form of a fine powder, i.e., a powder having an average particle size of 0.01 to 1 microns. The mixture of aluminum hydride, a conductive element and a binder is pressed around a current collector made of nickel, stainless steel or graphite. The anode is preferably shaped in such a way to provide an easy replacement.

The air cathode may be made according to Example 1 of U.S. Pat. No. 4,756,980, which is incorporated by reference.

When the cathode comprises a metal oxide or hydroxide, the metal may be selected from the group consisting of manganese, nickel, and silver, in substantially pure form, or as a mixture containing two or more of manganese, nickel and silver in varying proportions. In yet another embodiment, an active cathodic material may be used, e.g., a liquid such as hydrogen peroxide, or the potassium, sodium, ammonium, magnesium, calcium, cesium, aluminum, or lithium salts of ferricyanide or mixtures thereof, or salts such as $(NH_4).Fe(CN)_5 (NH_3)$, in which one or more of the CN ligands is replaced with alternative ligands. Suitable replacements for ferricyanide salts include ferrocene/ferrocenium derivatives with similar electrochemical properties to ferricyanide salts. The ferricyanide salt solution may also contain an alkaline compound, or a salt, or seawater, or mixtures thereof or the like, at a concentration of 5 to 30 wt % preferably, 20 to 25 wt % based on the combined weight of the active cathodic element and the weight of the electrolyte. The salt may be added to the liquid electrolyte to function as the cathode. An example of a permanganate cathodic species is described in the drawings and text of U.S. Pat. No. 5,549,991, which is incorporated by reference. An example of a ferricyanide cathodic species is described in the drawings and text of U.S. Pat. No. 5,472,807, which is incorporated by reference.

Although the battery of the invention is not rechargeable by using an electric current, as is a secondary battery, the battery may be recharged by either changing the electrolyte or by replacement of the aluminum hydride anode when the aluminum hydride anode becomes spent or highly corroded. Replacing the electrolyte avoids the need to discard the battery before the full anode capacity is spent.

In FIG. 1, cell 10 is a schematic drawing of an aluminum hydride—air cell according to the present invention, which comprises a vessel 24, having an electrolyte chamber filled with an aqueous electrolyte 14. The aluminum hydride anode 12 is in contact with electrolyte 14. An air cathode 18 having a current collector is in contact with electrolyte via separator 16. The air cathode is also in contact with air via a hydrophobic membrane 20, a diffusion layer 22 and a number of holes 26 in the vessel 24. The air cathode optionally contains an oxygen reduction catalyst. The anode cathode current collectors extend above the cell, and they may be connected to other cells in series or parallel, depending upon the power and voltage required. A vented closable opening 30 is provided for adding electrolyte and for allowing gases to escape to prevent the cell from being over-pressurized. A conduit 28 is preferably provided in the bottom of the electrolyte chamber, in order to allow for any solid aluminate discharge from the anode to be deposited, thus avoiding premature failure of the cell. The conduit may also be used to drain the electrolyte 14, when drainage is desired. The cell 10 may be oriented vertically or horizontally, and can be built in a variety of shapes (prismatic cylindrical, button, etc.)

Figure 2:
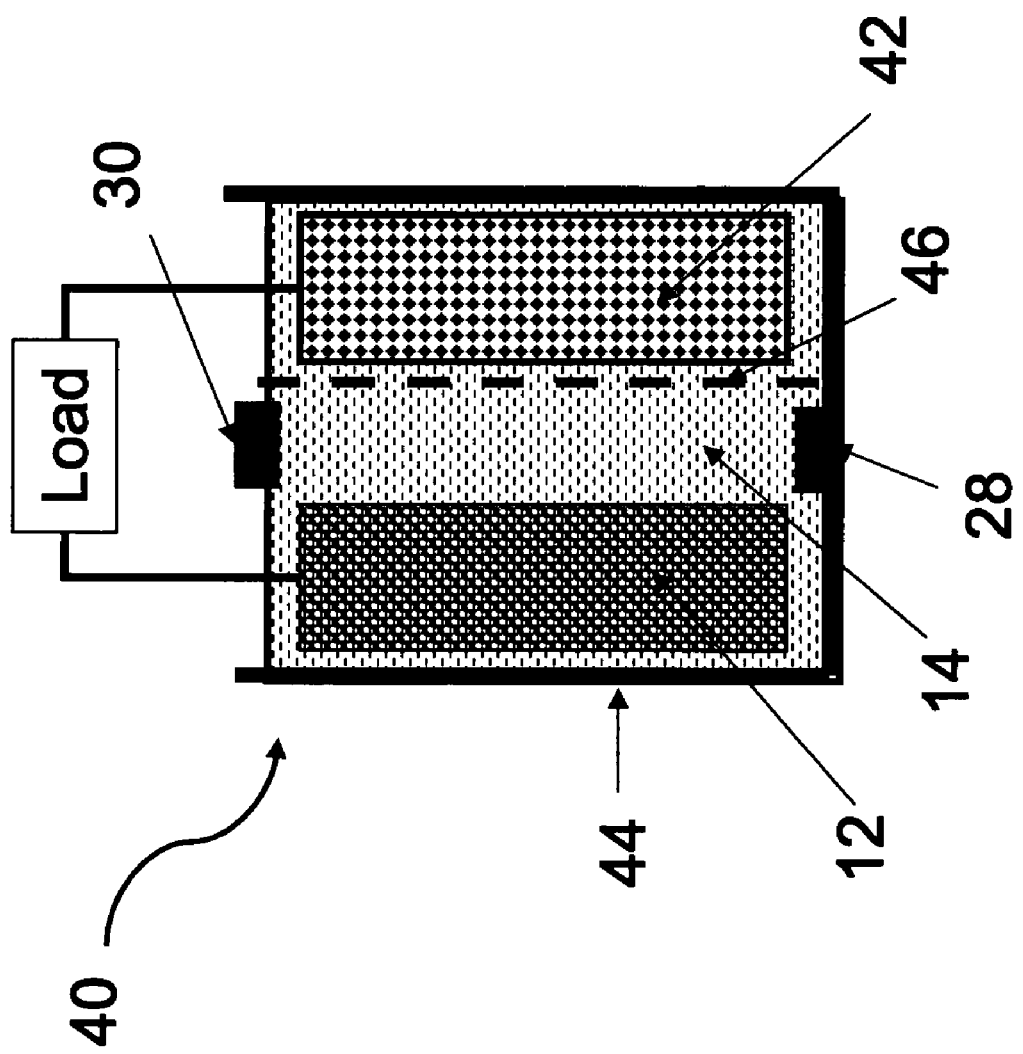
FIG. 2 is a schematic diagram of the cell with an aluminum hydride anode and an oxygen-containing cathode according to the invention.

FIG. 2 is a schematic drawing of an electrochemical cell 40 with the aluminum hydride anode 12 according to one embodiment of the present invention, which comprises a vessel 44 filled with an aqueous electrolyte 14. In the vessel 44 are placed a sheet cathode 42, which has a grid structure with incorporated current collector and optionally an upright frame (not shown), which may be disposed around the grid and sheet cathode. The aluminum hydride anode 12 is spaced apart from the sheet cathode 42 and both are suspended in electrolyte 14, and optionally separated by a separator 46, to avoid direct electrical contact. The current collectors of the anode 12 and the cathode 42 extend above the cell, and they may be connected to other cells in series or in parallel, depending upon the power and voltage required. A vented closable opening 30 is provided for adding electrolyte, and for allowing gases to escape to prevent the cell from being over-pressurized. A conduit 28 is preferably provided below the anode and cathode, as described previously.

The reserve-type electrochemical batteries 10 and 40 can be stored indefinitely with the electrolyte 14 separated from the electrodes 12 and 42, i.e., with the electrolyte 14 stored in a separate electrolyte container, or filled from an external source, for example, seawater from a sea.

These batteries are useful in a number of applications. For example, they can be used as power sources, e.g., as energy storage devices in situations where light weight and relatively high energy are required. They can also be used to re-charge secondary batteries.

Example

To demonstrate the discharge ability of an aluminum hydride anode, the electrode with the following composition has been built: 50 wt. % $AlH_3$ prepared accordingly the procedure described by F. M. Brower et al. in Journal of the American Chemical Society 1976, v. 98, pp. 2450-3, 40 wt. % Ni as a current collector, 10% PVDF as a binder pressed on a stainless steel mesh. The electrode was immersed in a beaker type electrochemical cell with a nickel foam counter electrode and the Ag/AgCl reference electrode filled with 1 M (5.8 wt %) solution of NaCl in acetate buffer (pH=6.4) as electrolyte. At the electrode potential above 1.1 V (1.31 V vs, NHE) electrochemical reaction with evolution of hydrogen gas at the cathode and formation of a cloudy precipitate of Al(OH)$_3$ near the anode started. The demonstrated cell potential is close to the potential of a cell comprising an aluminum metal anode, with neutral (pH close to 7) water as the anolyte (1.48 V).

The cell reactions can be described by the following equations:

Anode: $2AlH_3 + 6OH^- \rightarrow 2Al(OH)_3 + 6e^-$

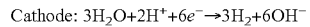

Cathode: $3H_2O + 2H^+ + 6e^- \rightarrow 3H_2 + 6OH^-$

Overall: $2AlH_3 + 3H_2O \rightarrow 2Al(OH)_3 + 3H_2$

After the electric circuit was interrupted, the formation of aluminum hydroxide at the anode and evolution of hydrogen at the cathode immediately stopped, and the open circuit voltage (OCV) of the cell remained constant, which points to chemical stability of the aluminum hydride anode in the used electrolyte.

While this invention has been described in detail, with reference to specific embodiments, it will be apparent to those of ordinary skill in this area of technology that other modifications of this invention (beyond those specifically described herein) may be made, without departing from the spirit of the invention. Accordingly, the modifications contemplated by those skilled in the art should be considered to be within the scope of this invention. Furthermore, all of the patents, patent publications, articles, texts, and other references mentioned above are incorporated herein by reference.

What is claimed:

1. A battery having a plurality of cells, wherein each cell comprises:

a vessel, further comprising
- (a) an anode comprising aluminum hydride and a conductive material;
- (b) an air diffusion cathode that is in contact with air, via a number of holes in the vessel; and
- (c) an electrolyte chamber filled with an aqueous non-alkaline electrolyte;

wherein the anode and cathode are in contact with the electrolyte, so as to produce hydrogen protons by way of the discharge reaction during operation of the battery.

2. A cell as defined in claim 1, wherein the anode further comprises a binder.

3. A cell as defined in claim 1, wherein the conductive material is carbon.

4. A cell as defined in claim 1, wherein the conductive material is copper or aluminum.

5. A cell as defined in claim 1, wherein the binder is a polytetrafluoroethylene polymer or co-polymer.

6. An energy storage device, comprising the battery of claim 1.

7. A reserve battery, comprising a plurality of aluminum hydride cells, wherein at least one cell comprises a vessel, further comprising:
- (a) an anode comprising aluminum hydride, a binder and a conductive material selected from the group consisting of copper, aluminum, and carbon and
- (b) a cathode comprising an air diffusion cathode; wherein the cathode is in contact with air via a number of holes in the vessel; and wherein the cell produces hydrogen protons by way of the discharge reaction during operation of the reserve battery.

* * * * *